(12) United States Patent  (10) Patent No.: US 7,971,503 B2
Nakamura                  (45) Date of Patent:     Jul. 5, 2011

(54) JOINT MECHANISM

(75) Inventor: Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 536 days.

(21) Appl. No.: 12/160,800

(22) PCT Filed: Jan. 12, 2007

(86) PCT No.: PCT/JP2007/050358
§ 371 (c)(1),
(2), (4) Date: Jul. 14, 2008

(87) PCT Pub. No.: WO2007/080988
PCT Pub. Date: Jul. 19, 2007

(65) Prior Publication Data
US 2010/0154579 A1    Jun. 24, 2010

(30) Foreign Application Priority Data
Jan. 13, 2006  (JP) .................. 2006-005617

(51) Int. Cl.
B25J 17/00   (2006.01)
B25J 17/02   (2006.01)
B25J 18/00   (2006.01)

(52) U.S. Cl. ...................... 74/490.01; 901/48

(58) Field of Classification Search ............... 74/490.01, 74/490.05, 490.06, 606 A, 606 R; 184/27.1, 184/27.4, 32; 901/22, 48; 417/515, 516, 417/517, 518, 522, 534
See application file for complete search history.

(56) References Cited

U.S. PATENT DOCUMENTS

| 2,893,353 | A | * | 7/1959 | Short, Jr. et al. | 92/51 |
| 4,297,908 | A | * | 11/1981 | Zimmer | 74/469 |
| 4,378,959 | A | * | 4/1983 | Susnjara | 414/732 |
| 5,220,849 | A | * | 6/1993 | Lande et al. | 74/479.01 |
| 2004/0093975 | A1 | | 5/2004 | Amparore | |

FOREIGN PATENT DOCUMENTS

| EP | 1972830 A | 9/2008 |
| JP | 59 167486 A | 9/1984 |
| JP | 09085674 A | 3/1997 |
| JP | 11-262889 A | 9/1999 |
| JP | 2001-225293 A | 8/2001 |
| JP | 2004-160634 A | 6/2004 |
| JP | 2005-319550 A | 11/2005 |

* cited by examiner

*Primary Examiner* — Justin Krause
(74) *Attorney, Agent, or Firm* — Panitch Schwarze Belisario & Nadel LLP

(57) ABSTRACT

There is provided a joint mechanism constituted by a base 1, a turning base 4 provided above the base and rotated, and an arm 6 a lower end portion is pivotably supported by the turning base, in which a speed reducer 2 for rotating the turning base is provided at inside of the base, a counterbalance system 10 constituted by a cylinder 7 pivotably supported above the turning base and filled with a lubricant, a piston 8 provided in a hermetically sealed state slidably in a longitudinal direction at inside of the cylinder, and a piston rod 9 one end portion of which is connected to the piston and other end portion of which is connected to the arm 6 is provided, the speed reducer and the cylinder of the counterbalance system are connected and a lubricant of the speed reducer is introduced into the cylinder.

2 Claims, 2 Drawing Sheets

JOINT MECHANISM

CROSS-REFERENCE TO RELATED APPLICATION

This application is a Section 371 of International Application No. PCT/JP2007/050358, filed Jan. 12, 2007, which was published in the Japanese language on Jul. 19, 2007, under International Publication No. WO 2007/080988 A1, and the disclosure of which is incorporated herein by reference.

TECHNICAL FIELD

The present invention relates to a joint mechanism. Further in details, the invention relates to an improvement in a balancer mechanism of an arm of a joint mechanism, for example, relates to a technology which can be adopted in a balancer mechanism of an arm of an articulated robot used in, for example, loading up or loading down a carton case, a goods delivery box or the like, or in an automobile assembly line.

BACKGROUND ART

In a balance system of canceling an rotation moment of a rotation shaft of a horizontal arm generated by a weight of the horizontal arm in an articulated robot of the background art, there are a counterweight system, a system of utilizing an urge force of a tension spring or a compression spring, or a system of balancing by utilizing a force provided by a hydraulic pressure by using a cylinder and a piston, a system of using both thereof or the like.

According to the counterweight system, a weighted object is arranged at a rotation axis symmetric position of a horizontal arm to directly balance, or a balance is taken by installing a counterweight at a vertical axis rear portion and connected to a horizontal arm by using a link. However, the system is provided with drawbacks that an interfering region of a robot is large, also a weight thereof is heavy, an inertia load is large or the like.

Therefore, normally, it is general to provide a balance force by utilizing a spring or a cylinder urged by a pressurized fluid. That is, there is constructed a direct spring balance structure in which when a weight of a horizontal arm pivoted by constituting a rotating shaft by a shaft of an upper end of a vertical arm pivoted above a turning base, an upper side of the vertical arm is provided with a member moved in parallel therewith while maintaining a vertical direction, and a tension spring urged obliquely between a front end of the member and the horizontal arm is hung to be expanded.

However, according to the direct spring balance system of hanging to expand the tension spring obliquely between the front end of the member provided on the upper side of the vertical arm and moved in parallel therewith while marinating to be vertical and the horizontal arm of the background art, an expanded portion of the member is large, also the weight is large, and therefore, when a range of operating the robot is going to be widened, a total of the apparatus is enlarged, the spring is exposed to outside, which is dangerous. Further, since the tension spring is used, a fatigue rupture is liable to be brought about at a hanger portion by a stress concentration and when the spring is destructed, there is a danger of dropping the arm.

In this way, according to the background art system, the expanded portion of the member is large and also the weight is large. Hence, there is proposed a constitution of installing a spring for a balance at a vicinity of a turning base (refer to, for example, Patent Reference 1 (JP-A-59-167486)).

According to the constitution, an inclination of a horizontal arm is moved to a vicinity of a rotation drive shaft of a vertical arm in parallel therewith by a parallel link mechanism and a balance force is exerted by a tension spring or a compression spring urged at the position.

According to a structure of a balancer utilizing a cylinder urged by a pressurized fluid (air pressure or oil pressure), the spring of the balancer utilizing the spring is replaced by an air pressure cylinder or an oil pressure cylinder, and a pressure adjusting function of the pressurized fluid is added to be installed.

According to the constitution of balancing by the spring by moving the inclination of the horizontal arm to above the turning base in parallel therewith by the parallel link mechanism disclosed in Patent Reference 1, similar to the above-described background art apparatus, the spring is exposed to outside, which is dangerous, the tension spring is used, and therefore, a fatigue rupture is liable to be brought about at a hanger portion and when the spring is destructed, there is a danger of dropping the arm.

Further, in Patent Reference 2 (JP-A-11-262889), with an object of providing a simple balancer mechanism of a horizontal arm bringing a main body of the balancer to inside of the horizontal arm and using a compression spring, there is proposed to constitute a balancer apparatus in which in an industrial articulated robot constituting a parallel link of moving a link arm and a wrist relative to a turning base in parallel therewith and including a motor fixedly provided to the turning base for driving to pivot an upright arm and a motor for driving to pivot the horizontal arm, a cantilever load by a weight of the horizontal arm at an arm shaft is balanced by a lever rotatably supported by a horizontal shaft provided at an upper side of the vicinity of the center of the horizontal arm and projecting an arm in an up and down direction, a lever rod for coupling a shaft fixedly provided onto the link arm and an upper arm end of the lever by a pin, and a pulling device provided at inside of the horizontal arm for coupling one end portion of the horizontal arm through a pin and coupling a loose end portion to a lower arm end of the lever by a pin.

Patent Reference 1: JP-A-59-167486
Patent Reference 2: JP-A-11-262889

DISCLOSURE OF THE INVENTION

Problems that the Invention is to Solve

The above-described counterbalance mechanism of the background art is provided independently from a speed reducer, there is a case in which a rise in a temperature of a lubricant of the speed reducer cannot be restrained and the speed reducer is broken at early time. Further, there poses a problem of an increase in a contamination degree of the lubricant by a wear powder at inside of the speed reducer.

It is an object of the invention to resolve the problem accompanied by the background art apparatus, restraining the rise in the temperature of the lubricant of the speed reducer, preventing the speed reducer from being destructed at early time and eliminating the problem of the rise in the contamination degree of the lubricant by the wear powder at inside of the speed reducer.

Means for Solving the Problems

The invention achieves the above-described problem by a joint mechanism comprising a base, a turning base provided above the base and rotated, and an arm a lower end portion of which is pivotably supported by the turning base, wherein a speed reducer for rotating the turning base is provided at inside of the base, a cylinder pivotably supported above the turning base and filled with a lubricant, a piston provided in a hermetically sealed state at inside of the cylinder slidably in a longitudinal direction, and a piston rod one end portion of which is connected to the piston and other end portion of which is connected to the arm are provided, the speed reducer and the cylinder are connected, and the lubricant of the speed reducer is introduced into the cylinder.

It is preferable to constitute such that a spring for urging the piston to a side opposed to the arm is provided between an end face of the cylinder on a side of the arm and the piston, and a counterbalance system is constituted by the cylinder, the piston, the piston rod and the spring.

Advantage of the Invention

According to the invention, the speed reducer and the cylinder of the counterbalance system are connected and the lubricant of the speed reducer is introduced into the cylinder. Therefore, in comparison with a case of using the lubricant only at inside of the speed reducer as in the background art, a total amount of the lubricant is increased, and therefore, a rise in a temperature of the lubricant by using the speed reducer can be restrained, the speed reducer can be used in a stable state and early destruction of the speed reducer can be prevented.

Further, according to the invention, the total amount of the lubricant is increased, and therefore, an increase in a contamination degree of the lubricant by a wear powder at inside of the speed reducer can be restrained and the speed reducer can be operated in a clean state.

Further, according to the invention, the counterbalance system can be constituted by a size to a degree the same as that of the counterbalance mechanism used in the background art, and therefore, a range of operating an apparatus provided with the joint mechanism of an industrial robot or the like is not hampered. Further, the size of the counterbalance system of the invention is constituted by a size to a degree the same as that of the counterbalance mechanism used in the background art, and is applicable to all of industrial robots.

Further, according to the invention, the piston rod of the counterbalance system is connected to the arm, and a movement of the arm can be utilized as a pump without separately preparing a power for the pump.

BEST MODE FOR CARRYING OUT THE INVENTION

Figure 1:
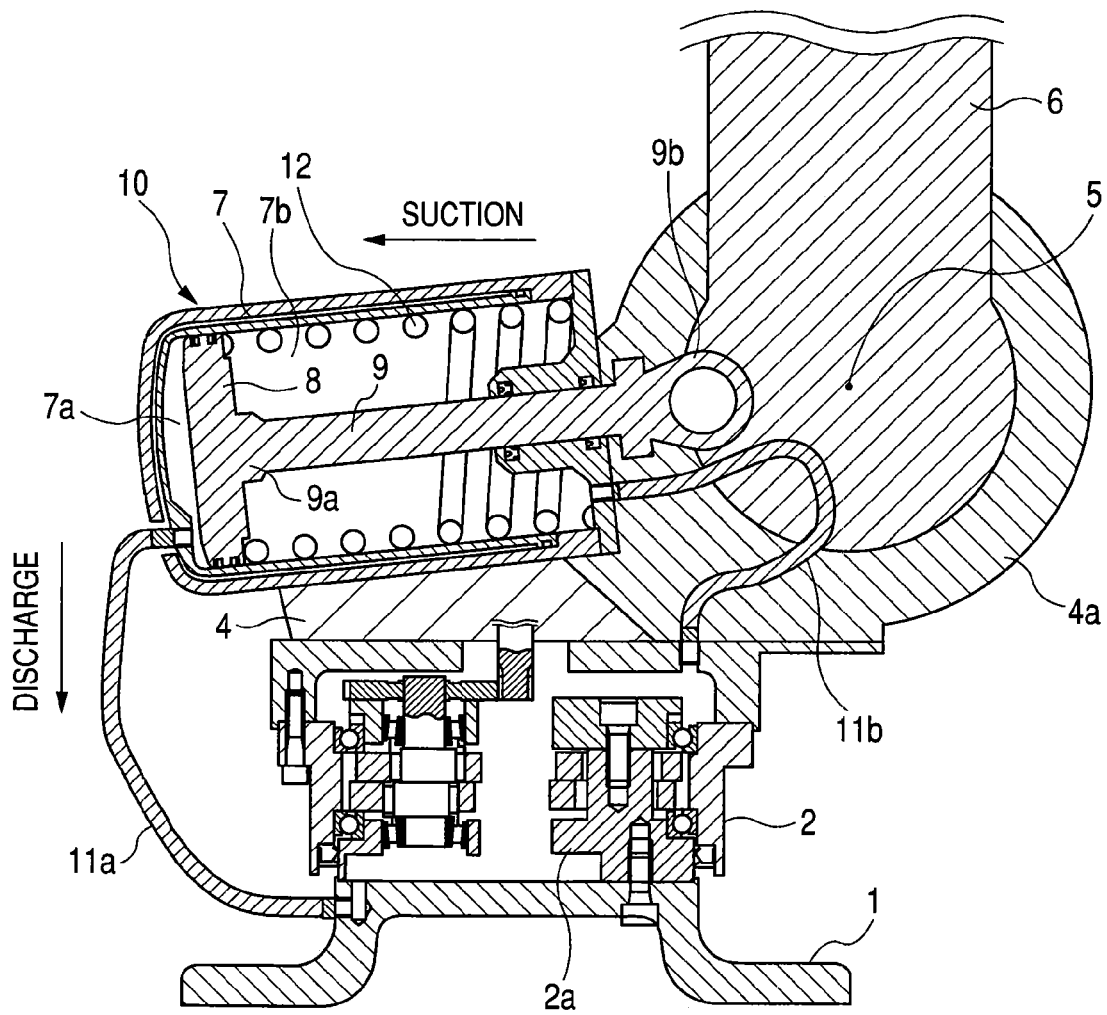
FIG. 1 is a sectional view of an essential portion of an embodiment of the invention embodied in a joint mechanism of an industrial robot, showing a state of sucking a lubricant to a right chamber at inside of a cylinder by moving a piston in a counter arm direction.

The invention will be explained in details in reference to the attached drawings illustrating an embodiment of the invention as follows. FIG. 1 is a sectional view of an essential portion of an embodiment of the invention embodied to a joint mechanism of an industrial robot, showing a state of sucking a lubricant to a right chamber at inside of a cylinder by moving a piston in a counter arm direction, and FIG. 2 shows a state of discharging the lubricant of the right chamber at inside of the cylinder by moving the piston in an arm direction in the embodiment of FIG. 1.

Figure 2:
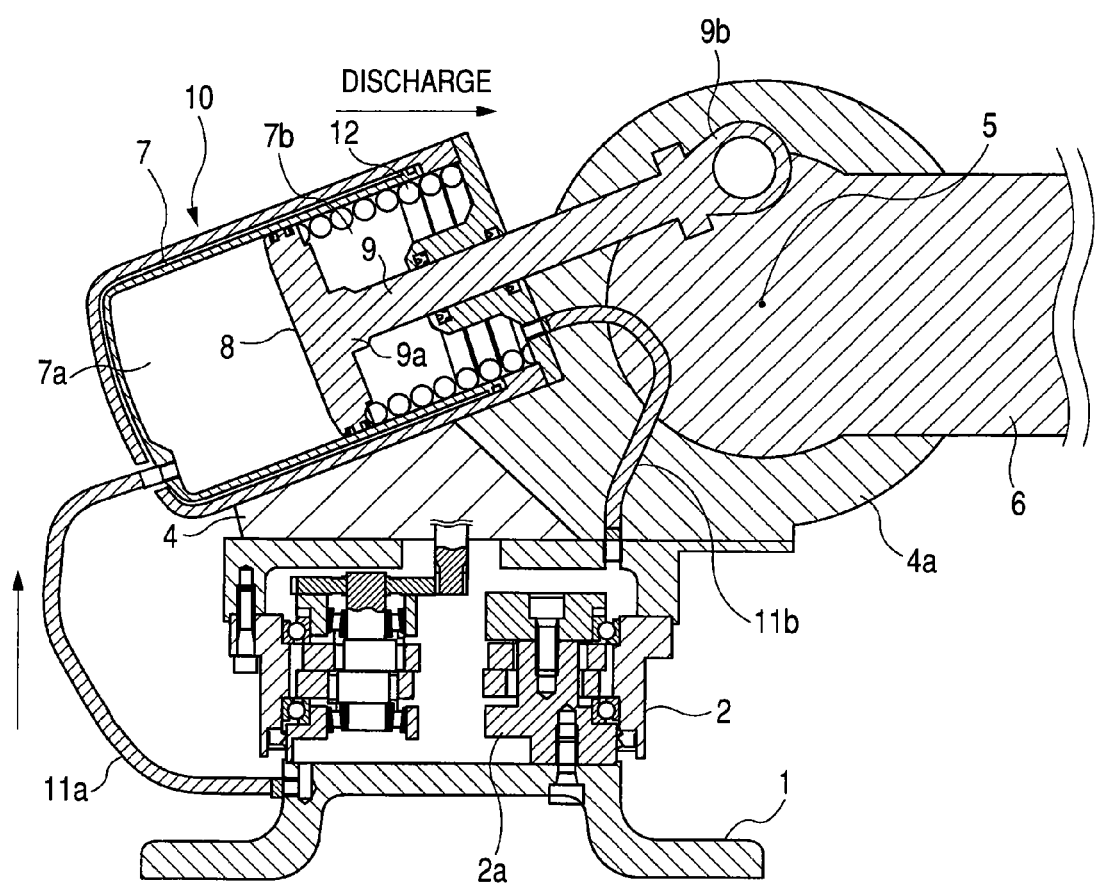
FIG. 2 shows a state of discharging the lubricant of the right chamber at inside of the cylinder by moving the piston in an arm direction in the embodiment of FIG. 1.

In FIG. 1 and FIG. 2, a speed reducer attaching bracket 2 is attached to a base 1 of an industrial robot, and a speed reducer 2a is provided at inside of the speed reducer attaching bracket 2. A style of the speed reducer 2a is not particularly limited but a publicly-known structure can be used, for example, a planetary gear apparatus comprising a crankshaft, a pinion formed with outer teeth at an outer periphery thereof, fitted to a crank portion of the crankshaft and eccentrically moved, and a case formed with inner teeth brought in mesh with the outer teeth of the pinion at an inner peripheral face thereof, or a wave gear speed reducer comprising a wave generator, a flex-spline and a circular spline or the like can be used.

A turning base 4 is provided above the base 1, the turning base 4 is rotated in a horizontal face by an output of the speed reducer 2a. A shaft portion 4a is provided above the turning base 4, a lower end portion of an arm 6 is supported by the shaft portion 4a pivotably around a horizontal axis line 5, and the arm 6 is pivoted in a vertical face by a power from a pivoting drive source (not illustrated). The joint mechanism of the invention is constituted as described above. Further, other end portion of the arm 6 is pertinently connected with other arm (not illustrated).

A cylinder 7 is supported by a pin pivotably between a pair of brackets (not illustrated) provided above the turning base 4. Inside of the cylinder 7 is provided with a piston 8 in a hermetically sealed state slidably in a longitudinal direction. One end portion 9a of a piston rod 9 is integrally connected to the piston 8 and other end portion 9b thereof is axially attached to the arm 6.

A counterbalance system 10 of the invention is constituted by the cylinder 7, the piston 8 and the piston rod 9. A left chamber 7a disposed on a left side of the piston 8 at inside of the cylinder 7 of the counterbalance system 10 and a right chamber 7b disposed on a right side thereof are respectively connected to the base 1 and the turning base 4 through hydraulic pipes 11a and 11b, a lubricant of the speed reducer 2a at inside of the speed reducer attaching bracket 2 is introduced into the cylinder 7 and the lubricant is filled at inside of the cylinder 7.

In the counterbalance system 10 of the embodiment, a compression spring 12 for urging the piston 8 to a counter side of the arm 6 is provided between an end face of the cylinder 8 on a side of the arm 6 and the piston 8, and the counterbalance system 10 always urges the arm 6 in the counterclockwise direction.

As shown by FIG. 1, when the arm 6 is pivoted in the counterclockwise direction, the piston 8 is moved in a left direction by the piston rod 9 connected to the arm 6, and the lubricant filled in the left chamber 7a at inside of the cylinder 7 is supplied to the speed reducer 2a by passing the pipe 11a, and the lubricant of the speed reducer 2a is filled into the right chamber 7a at inside of the cylinder 7 by passing the pipe 11b.

Conversely, as shown by FIG. 2, when the arm 6 is pivoted in the clockwise direction, the piston 8 is moved in a right direction by the piston rod 9 connected to the arm 6, the lubricant filled in the right chamber 7b at inside of the cylinder 7 passes the pipe 11b to be supplied to the speed reducer 2a, the lubricant of the speed reducer 2a passes the pipe 11a to be filled in the left chamber 7b at inside of the cylinder 7.

According to the invention, the lubricant of the speed reducer 2a at inside of the speed reducer attaching bracket 2 is introduced into the cylinder 7 by connecting the speed reducer attaching bracket 2 and the cylinder 7 of the counterbalance system 10. Therefore, in comparison with a case in which the lubricant is used only at inside of the speed reducer 2 as in the background art, a total amount of the lubricant is increased, and therefore, a rise in a temperature of the lubricant by using the speed reducer 2a is restrained, the speed reducer 2a can be used in a stable state, early destruction of the speed reducer 2a can be prevented, an increase in the contamination degree of the lubricant by a wear powder at inside of the speed reducer 2a can be restrained and the speed reducer 2a can be operated in a clean state.

INDUSTRIAL APPLICABILITY

According to the invention, the counterbalance system 10 can be constituted by a size to a degree the same as that of a counterbalance mechanism used in the background art, and therefore, the range of operating the apparatus provided with a joint mechanism of an industrial robot or the like is not hampered. Further, the size of the counterbalance system 10 of the invention is constituted by a size to a degree the same as that of the counterbalance mechanism used in the background art, and is applicable to all of industrial robots.

Further, according to the invention, the piston rod 9 of the counterbalance system 10 is connected to the arm 6, and a movement of the arm 6 can be utilized as a pump without separately preparing a power for the pump.

The invention claimed is:
1. A joint mechanism comprising:
a base,
a turning base provided above the base and rotated, and
an arm a lower end portion of which is pivotably supported by the turning base,
wherein a speed reducer for rotating the turning base is provided at inside of the base, a cylinder pivotably supported above the turning base and filled with a lubricant, a piston provided in a hermetically sealed state at inside of the cylinder slidably in a longitudinal direction, and a piston rod one end portion of which is connected to the piston and another end portion of which is connected to the arm are provided, the speed reducer and the cylinder are connected, and
the lubricant of the speed reducer is introduced into the cylinder.
2. The joint mechanism according to claim 1, wherein a spring for urging the piston to a side opposed to the arm is provided between an end face of the cylinder on a side of the arm and the piston, and
a counterbalance system is constituted by the cylinder, the piston, the piston rod and the spring.

* * * * *